United States Patent
Kiest, Jr.

(10) Patent No.: US 7,343,937 B2
(45) Date of Patent: Mar. 18, 2008

(54) METHOD OF LOCATING LINER WITHIN SEWER PIPE

(75) Inventor: Larry W. Kiest, Jr., Ottawa, IL (US)

(73) Assignee: LMK Enterprises, Inc., Ottawa, IL (US)

( * ) Notice: Subject to any disclaimer, the term of this patent is extended or adjusted under 35 U.S.C. 154(b) by 156 days.

(21) Appl. No.: 11/359,026

(22) Filed: Feb. 22, 2006

(65) Prior Publication Data

US 2006/0185747 A1    Aug. 24, 2006

Related U.S. Application Data

(60) Provisional application No. 60/655,162, filed on Feb. 22, 2005.

(51) Int. Cl.
*F16L 55/16* (2006.01)
*B29C 63/36* (2006.01)

(52) U.S. Cl. .................. 138/98; 138/97; 264/516; 264/269; 156/287; 405/150.1; 405/184.2

(58) Field of Classification Search .............. 138/98, 138/97; 264/269, 516, 267; 156/94, 287, 156/294, 574; 405/150.1, 184.1, 184.2
See application file for complete search history.

(56) References Cited

U.S. PATENT DOCUMENTS

| | | | | |
|---|---|---|---|---|
| 5,358,359 A | * | 10/1994 | Long, Jr. ................. | 405/184.2 |
| 5,765,597 A | | 6/1998 | Kiest ............................. | 138/98 |
| 5,794,663 A | * | 8/1998 | Kiest et al. .................... | 138/98 |
| 5,816,293 A | | 10/1998 | Kiest ............................. | 138/98 |
| 5,855,729 A | * | 1/1999 | Kiest et al. .................. | 156/423 |
| 5,950,682 A | * | 9/1999 | Kiest, Jr. ..................... | 138/98 |
| 5,964,249 A | * | 10/1999 | Kiest, Jr. ..................... | 138/98 |
| 6,021,815 A | * | 2/2000 | Kiest et al. ..................... | 138/98 |
| 6,039,079 A | * | 3/2000 | Kiest, Jr. ..................... | 138/98 |
| 6,199,591 B1 | * | 3/2001 | Kiest et al. .................. | 138/98 |
| 6,206,993 B1 | * | 3/2001 | Kiest et al. ................. | 156/156 |
| 6,427,726 B1 | | 8/2002 | Kiest ........................... | 156/94 |
| 6,540,439 B2 | * | 4/2003 | De Bruijn et al. ........ | 405/150.1 |
| 6,705,801 B1 | | 3/2004 | Kiest ........................ | 405/184.1 |
| 6,708,728 B2 | * | 3/2004 | Driver et al. ................. | 138/98 |
| 6,827,526 B2 | * | 12/2004 | Warren ..................... | 405/184.2 |
| 6,960,313 B2 | * | 11/2005 | Waring et al. ........... | 264/36.17 |
| 6,969,216 B2 | * | 11/2005 | Driver ...................... | 405/184.2 |
| 7,108,456 B2 | * | 9/2006 | Driver et al. ............ | 405/184.2 |
| 7,121,766 B2 | * | 10/2006 | De Bruijn et al. ....... | 405/184.2 |

FOREIGN PATENT DOCUMENTS

DE        103 57 059 A    4/2005

* cited by examiner

*Primary Examiner*—Patrick F. Brinson
(74) *Attorney, Agent, or Firm*—McKee, Voorhees & Sease, P.L.C.

(57) ABSTRACT

A method of inserting a cured in-place pipe from a cleanout includes positioning a lining along a portion of a length of a bladder, wherein the lining is frangibly connected to the bladder, inserting the bladder through the cleanout, to a position wherein the lining is within the pipe and does not block the pipe.

28 Claims, 8 Drawing Sheets

METHOD OF LOCATING LINER WITHIN SEWER PIPE

CROSS-REFERENCE TO RELATED APPLICATIONS

The present application is based upon and claims priority to application Ser. No. 60/655,162 filed Feb. 22, 2005.

BACKGROUND OF THE INVENTION

The present invention relates to locating a liner within a sewer pipe during pipeline repair and particularly during cured in-place pipeline repair (CIPP). CIPP is typically a fabric tube, impregnated with a liquid resin, formed inside of an existing conduit and cured to become a one-piece, continuous new pipelining. CIPP is used to renew main sewer pipes or lateral sewer pipes as well as other types of conduits. When using CIPP for renewing both main and lateral pipes, the lining is either pulled in place and inflated or inverted and inflated.

A cleanout pipe is typical in all plumbing codes and therefore a cleanout pipe is common on lateral sewer pipes. The cleanout pipe provides one access point for entering the lateral. Another way of access is done remotely through a manhole into the main pipe and then into a lateral pipe. FIG. 1 is a pictorial representation showing the relationship between a main line pipe 10, a lateral pipe 12, manholes 14, 16, a cleanout pipe 18 and a house 20.

The liner may either be pulled into place or inverted into place. When a liner is pulled into place, either the lining has an outer coating or it does not have an outer coating. If the lining has an outer coating, the resin impregnated into the lining will remain contained within the coated tube preventing resin from migrating into pipe breaks and open joints. If the lining does not have an outer coating, the resin impregnated into the lining may be contaminated and even wiped off during the pulling in process.

A pulled in-place liner requires two access points. One access point is a manhole, which is commonly located in public streets. The other access point may be another manhole or can also be a cleanout pipe. However, it is often undesirable to require two separate access points and it would generally be considered advantageous to require only one access point.

The inversion method requires only one access point. It is generally a superior methodology to invert a liner, allowing the liner to be inserted into the pipe from only one access point, and allowing resin to contact the pipe directly and migrate into broken areas of the pipe without damaging the liner. However, inverting a liner through a cleanout pipe 18 and into the lateral line 12 creates an upstream side 38 (FIG. 2) blocking off the lateral line and service to the house. This is because in the prior art the liner is within both the cleanout pipe 18 and the lateral pipe 12, blocking off the lateral pipe 12 at 38. Therefore, the lining will need to be cut out after the resin has cured to reinstate service to the house. This type of reinstating process requires expensive equipment, requires additional time and if the cut is not smooth, solids will build up on the lining, causing backups.

It is therefore a general object, feature, or advantage of the present invention to improve upon the state of the art.

Another object, feature, or advantage of the present invention is to provide a single access bore for inverting a lateral liner into a pipe to be repaired.

Yet another object, feature, or advantage of the present invention is to provide a method for installing and positioning a liner within a sewer pipe that does not block off the sewer pipe.

A further object, feature, or advantage of the present invention is to provide an inversion method for installing a lateral liner through a clean out that does not require cutting out the liner to reinstate service to a house.

A still further object, feature, or advantage of the present invention is to provide an inversion method for installing a lateral liner through a clean out that does not involve a cutting or reinstating process requiring expensive equipment.

Another object, feature, or advantage of the present invention is to provide an inversion method for installing a lateral liner through a clean out that does not require additional time for a reinstating process or cutting.

Yet another object, feature, or advantage of the present invention is to provide an inversion method for installing a lateral liner through a clean out that does not require or create the potential of causing solid build ups resulting from a reinstating process.

A further object, feature, or advantage of the present invention is to provide an inversion method for installing a liner/bladder assembly through an access bore that allows the liner to be frangibly attached along the length (or portion of the length) of a bladder.

A further object of the present invention is the provision of a method of inverting a liner into a pipe through an access bore wherein the bladder is outside the access bore and the liner/bladder assembly is within the pipe.

A further object, feature, or advantage of the present invention is to provide an inversion method for installing a liner/bladder assembly through an access bore that allows the liner to be positioned along the length (or portion of the length) of a pipe using an inverting machine that does not enter the pipe.

A further object, feature, or advantage of the present invention is to provide an inversion method for installing a liner/bladder assembly through an access bore that allows the bladder to be connected to an inverting machine outside the pipe and allows the liner to be positioned along the length (or portion of the length) of a pipe.

A further object of the present invention is to position the liner within the sewer pipe in a position adjacent the area of the sewer pipe to be repaired without blocking the sewer pipe.

A further object of the present invention is to create a liner/bladder assembly wherein the liner is frangibly attached to the bladder and the frangible attachment is created without the need for expensive manufacturing equipment or factory settings, but can be done easily and efficiently in the field.

SUMMARY OF THE INVENTION

The foregoing objects may be achieved by a method of making a cured in-place pipe repair to a pipe having an area needing repair containing a first margin and a second margin. An access bore contains a lower access bore end in communication with the pipe and an upper access bore end. The method comprises taking an elongated bladder tube having a first bladder end and a second bladder end. The next step places an elongated liner tube within the bladder tube, the liner tube having first and second liner tube ends. The liner tube is impregnated with an uncured resin. The bladder tube is then inverted into the access bore and into the pipe to a position wherein the liner tube is to the outside of the bladder tube and is positioned adjacent the area of the pipe needing repair and does not block the pipe. The resin is then permitted to cure and harden and the bladder tube is removed, leaving the cured in place liner tube which does not block the sewer pipe.

Another feature of the above method includes determining the proper length and placement of the liner about the bladder.

According to another feature of the present invention, the positioning step is accomplished by inserting a photo cable having a lens into the sewer pipe and marking the photo cable twice to correspond to the opposite margins of the area of the sewer pipe to be repaired.

Another feature of the invention comprises frangibly attaching the liner tube to the bladder tube using an adhesive or a solvent that causes the liner tube to be attached to the bladder tube, but removable from the attachment to the bladder tube. This means of frangibly attaching the liner to the bladder can be easily accomplished in the field once the proper length and position of the liner within the pipe is determined.

According to another feature of the present invention, the pipe is a lateral pipe leading from a home and connected to a main pipe. The method comprises inverting the bladder/liner assembly into the sewer pipe and positioning the liner at the portion of the pipe needing repair by its placement within the bladder.

According to another feature of the present invention, the step of inverting the bladder/liner assembly is accomplished by an inversion machine.

According to another feature of the present invention, the step of inverting the bladder/liner assembly is accomplished by an inversion machine that is located in the atmosphere completely outside the access bore.

According to another feature of the present invention, the first end of the liner tube is positioned closer than the second end of the liner tube to the lower bore end of the access bore after the inverting step. The method comprises attaching the liner tube to the bladder tube only adjacent the first end of the liner tube.

According to another feature of the present invention, verification of the liner placement during inversion or after inversion is accomplished by inserting a camera into the bladder while the bladder is inflated.

Yet another feature of the present invention is a new method for lining the inner surface of a pipe or other conduit (not limited to sewer pipes) according to the procedures described herein.

DETAILED DESCRIPTION OF THE PREFERRED EMBODIMENT

Figure 1:
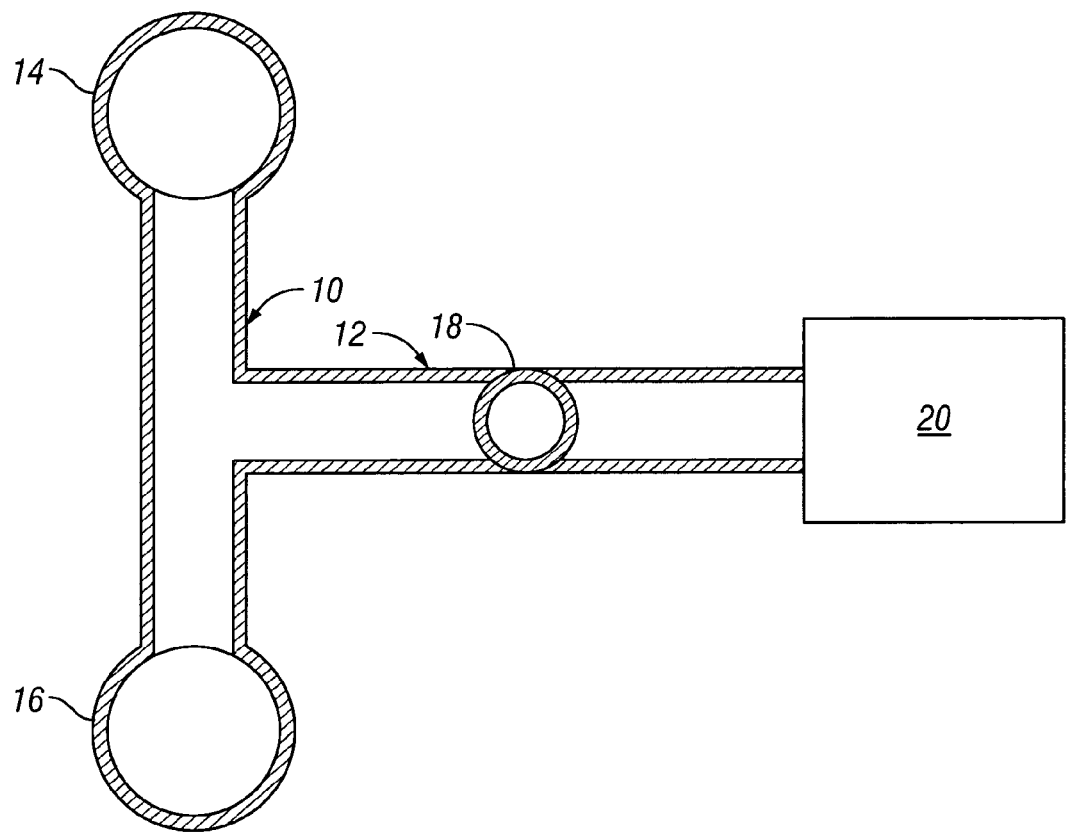
FIG. 1 is a top view illustrating a typical prior art sewer pipe system for a house.
Figure 2:
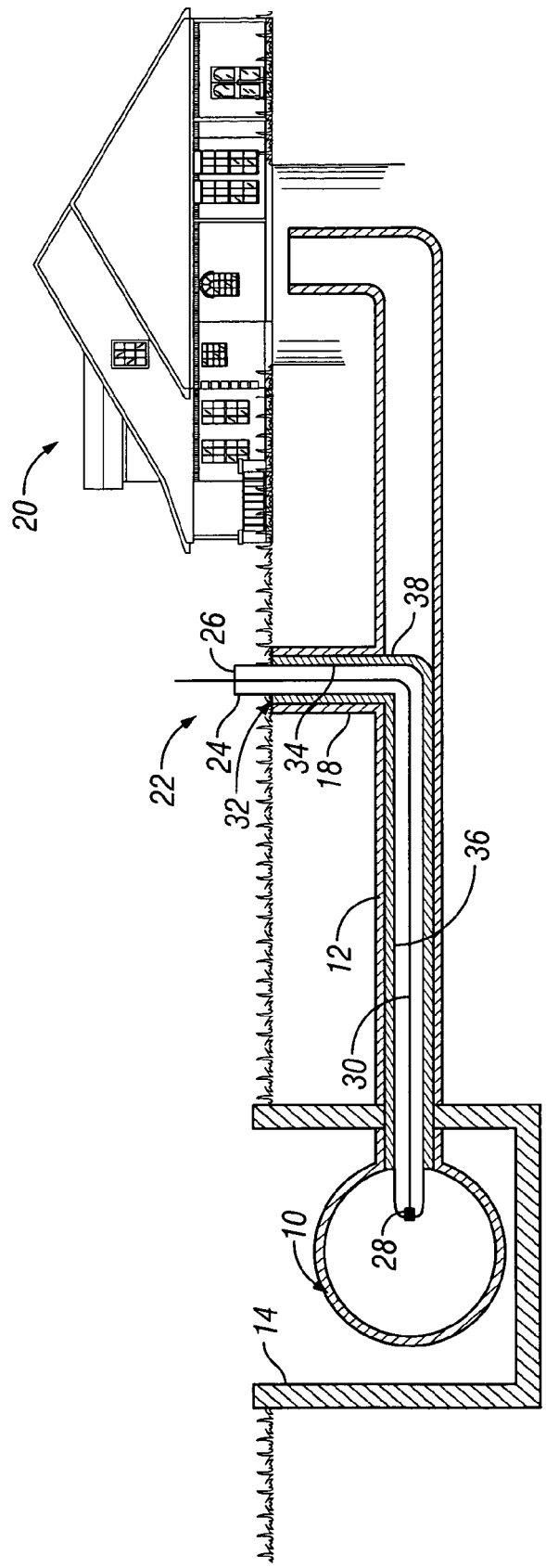
FIG. 2 is a pictorial representation illustrating a prior art clean out pipe where a cured in-place liner closes off service from the house.

Referring to the drawings, FIGS. 1 and 2 show a typical prior art construction. A prior art bladder/liner assembly 22 includes a bladder tube 24 having an open end 26 and a closed end 28. A pull line 30 is attached to the closed end 28. A liner tube 32 is positioned on the exterior of the bladder tube after inversion. As can be seen from FIG. 2, the liner tube 32 includes an access portion 34 of the liner tube 32 within the access pipe 18 and includes a lateral portion 36 of the liner tube 32 within the lateral line pipe 12. A blocked portion 38 of liner tube 32 is between the access portion 34 and the lateral portion 36 and blocks the sewage coming from house 20. Therefore it is necessary to cut out and remove the blocked portion 38 so that sewage can pass from the house 20 to the main line 10. If the cut out does not create a smooth transition between the liner and the host pipe at the invert of the host pipe, then sewage will tend to build up at portion 38 due to a jagged or rough edge created by the liner, which is an undesirable situation. It is preferable that there be no liner tube 34 within the access pipe 18 or blocking the blocked out portion 38.

Figure 3:
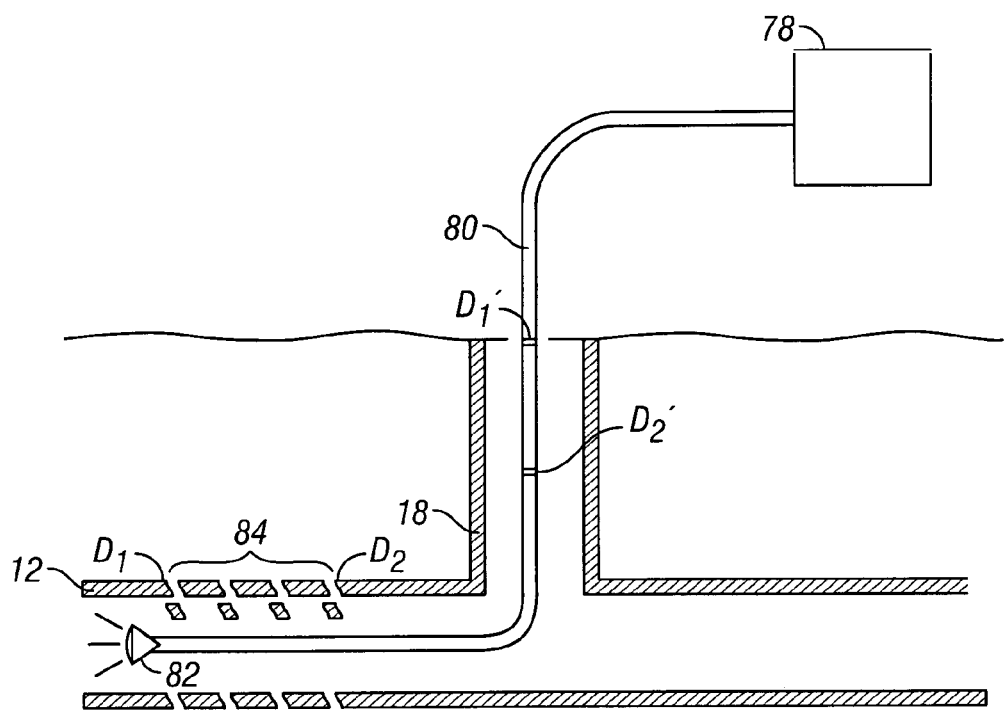
FIG. 3 is a sectional view showing the use of a photo cable to locate the position of the pipeline needing repair.

FIG. 3 shows the initial portion of the process for the present invention. A camera 78 includes an optic fiber cable 80 which extends downwardly into the sewer pipe to be repaired by means of a lens 82. 84 represents the area of the lateral pipe 12 needing repair. D1 represents one margin of the area needing repair and D2 represents the other margin of the area needing repair.

When the lens 82 first approaches D2 and visualizes one margin of the area 84 to be repaired, a mark is made on the optic fiber designated by the numeral D2'. Then when the lens 82 is moved further into the lateral pipe 12 it encounters and visualizes the margin designated by the numeral D1. At this point, the numeral D1' is marked on the portion of the cable 80 which is adjacent the top of the access pipe 18, all as shown in FIG. 3.

Figure 4:
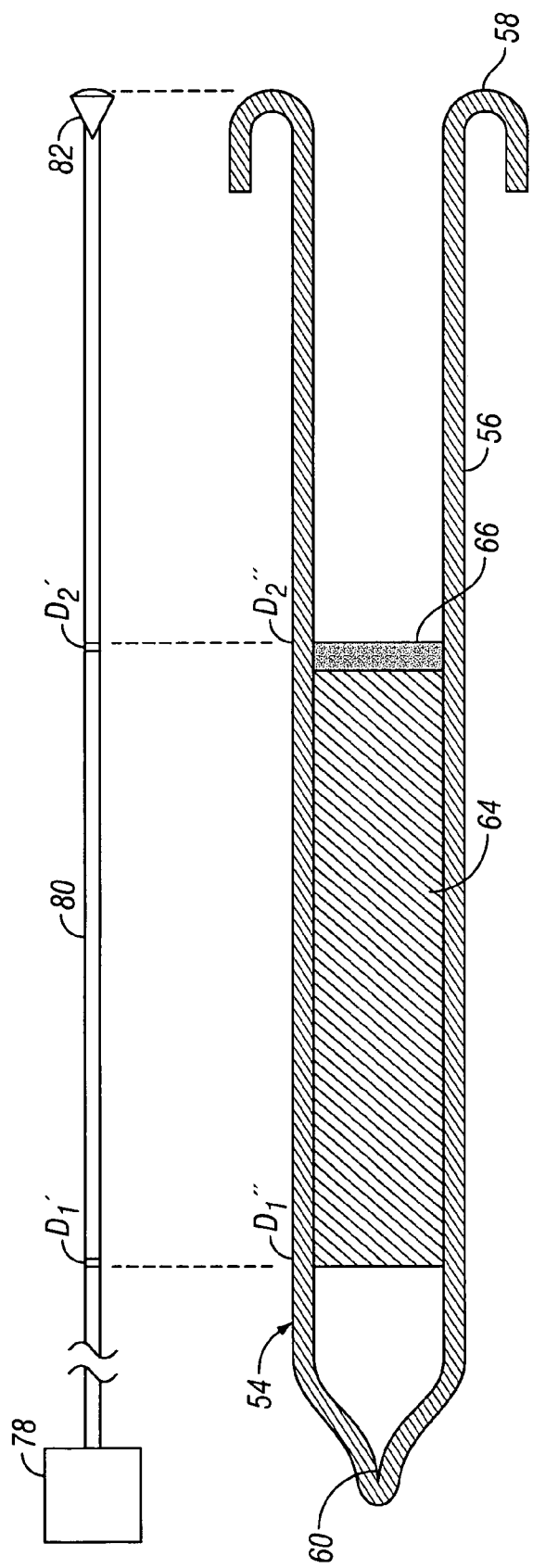
FIG. 4 is a view showing the use of the marked photo cable for locating the liner within the bladder.

FIG. 4 then illustrates the method by which the liner 64 is cut and positioned. As can be seen in FIG. 4, the cable 80 is laid out in a straight line, and the lens 82 is lined up with the open upper end 58 of the bladder tube 56. In this position the markings D1' and D2' of the cable 80 are used to determine the length of liner tube 64 and also are used to determine the position of liner tube 64 within the bladder tube 56. The end margins of liner tube 64 are designated by the numerals D1' and D2' in FIG. 4.

Figure 5:
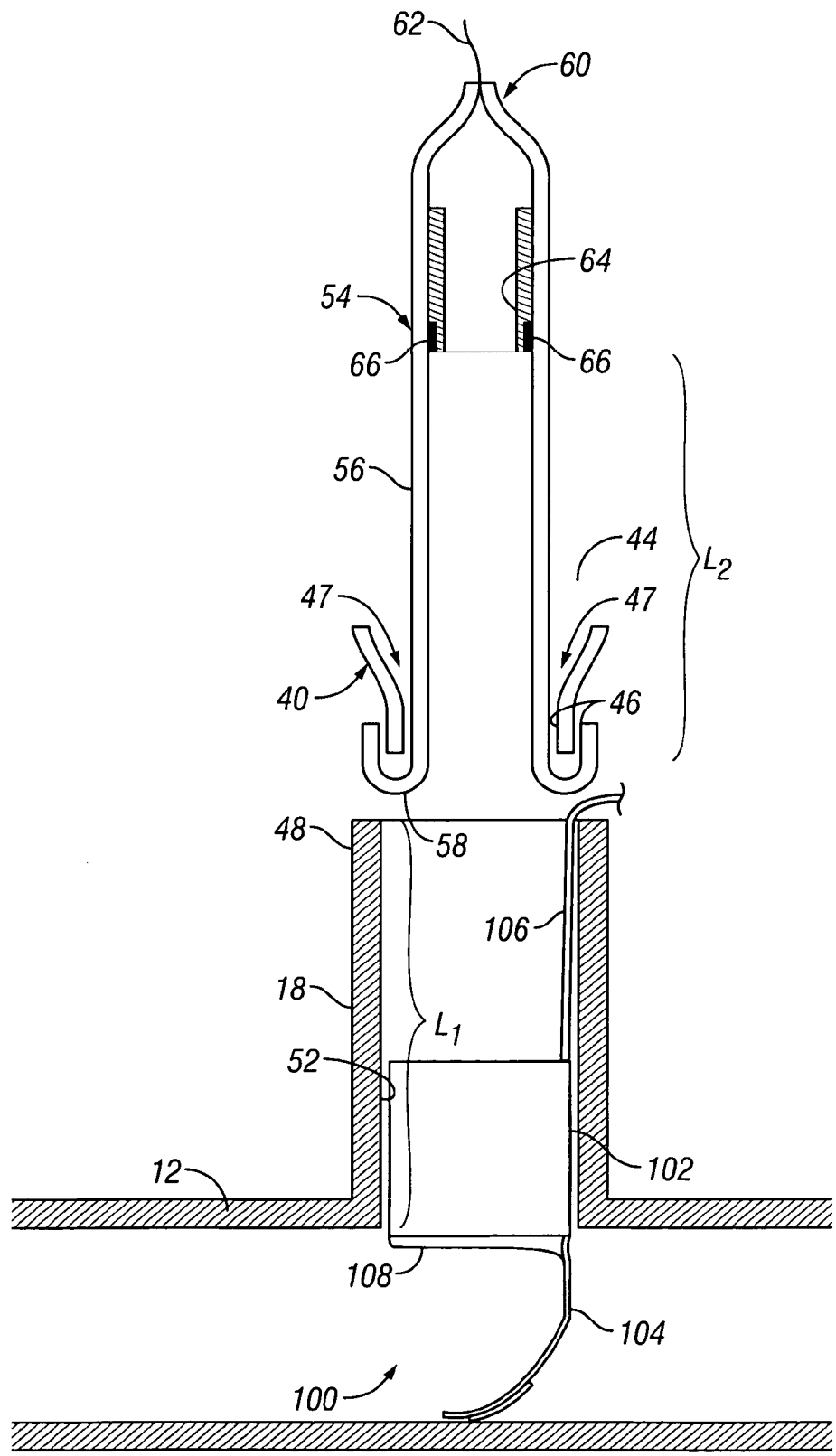
FIG. 5 is a pictorial schematic of the bladder/liner assembly of the present invention before inversion into the lateral pipe.
Figure 6:
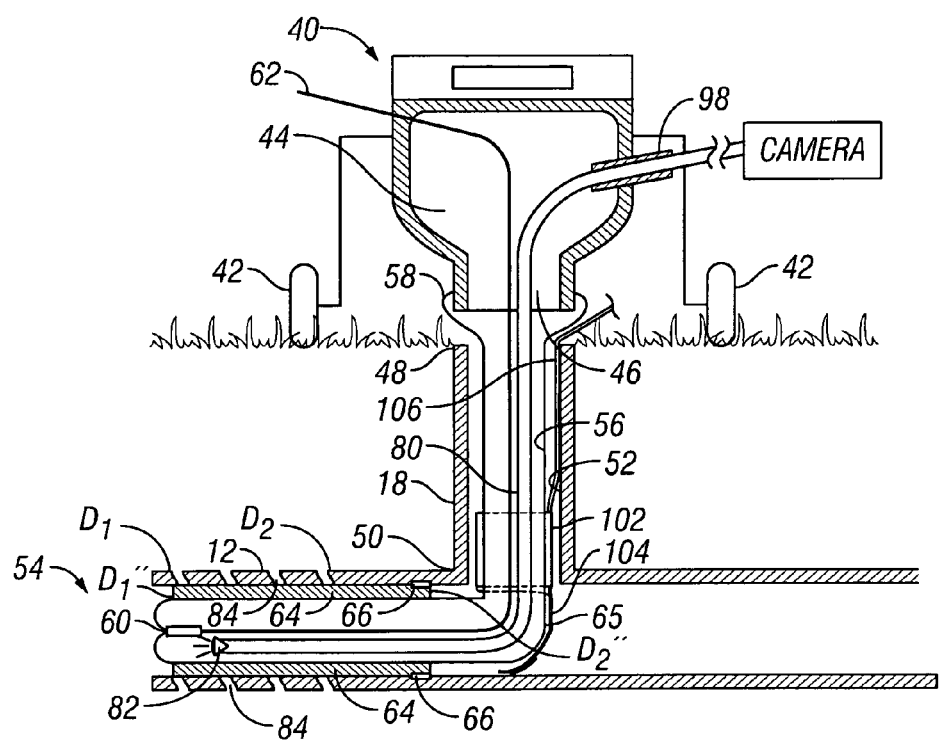
FIG. 6 is a view similar to FIG. 4, but showing the bladder/liner assembly after the inversion process.

Referring to FIGS. 5 and 6, an improved method for repairing pipe through an access pipe 18 is provided. An external launcher 40 (shown partially in FIG. 5 and fully in FIG. 6) is utilized outside the access pipe 18 and the lateral pipe 12. It includes wheels 42, a launcher chamber 44, and a launcher opening 46. Air pressure (not shown) is adapted to be injected into the launcher chamber 44 for causing the inversion of the tube. This air pressure is designated by arrows 47 in FIG. 5. Persons skilled in the art will recognize that other means of inversion could be used, such as a tower of water that is introduced into the bladder. The water creates head pressure that forces the bladder/liner assembly to invert.

The access pipe 18 includes an upper end 48 in communication with the atmosphere and a lower end 50 in communication with the lateral pipe 12. An access pipe bore 52 extends through the access pipe 18.

The upper end 58 of the bladder 56 of FIG. 4 is connected to the external launcher 40 and is attached to and surrounds the launcher opening 46. The bladder tube 56 also includes a closed end 60 having a pull line 62 attached thereto and extending upwardly to the outside of launcher 40.

The numeral 65 designates the non-blockage area comparable to the blockage area 38 shown in the prior art of FIG. 2. The difference between the non-blockage area 65 and the blockage area 38 is that the non-blockage area 65 includes only the bladder tube 56 and not the liner tube 64. The manner in which this is accomplished is shown in FIGS. 5 and 6. It should be noted that the access pipe 18 extends between its upper end 48 and its lower end 50, a distance L1. The distance between the open upper end 58 and the liner tube 64 is shown to be a distance L2 which is equal to or greater than the distance L1. This can be seen in FIG. 5, before the inversion process begins. The bladder/liner assembly 54 is positioned above the upper end 48 of the access pipe 18.

Figure 8:
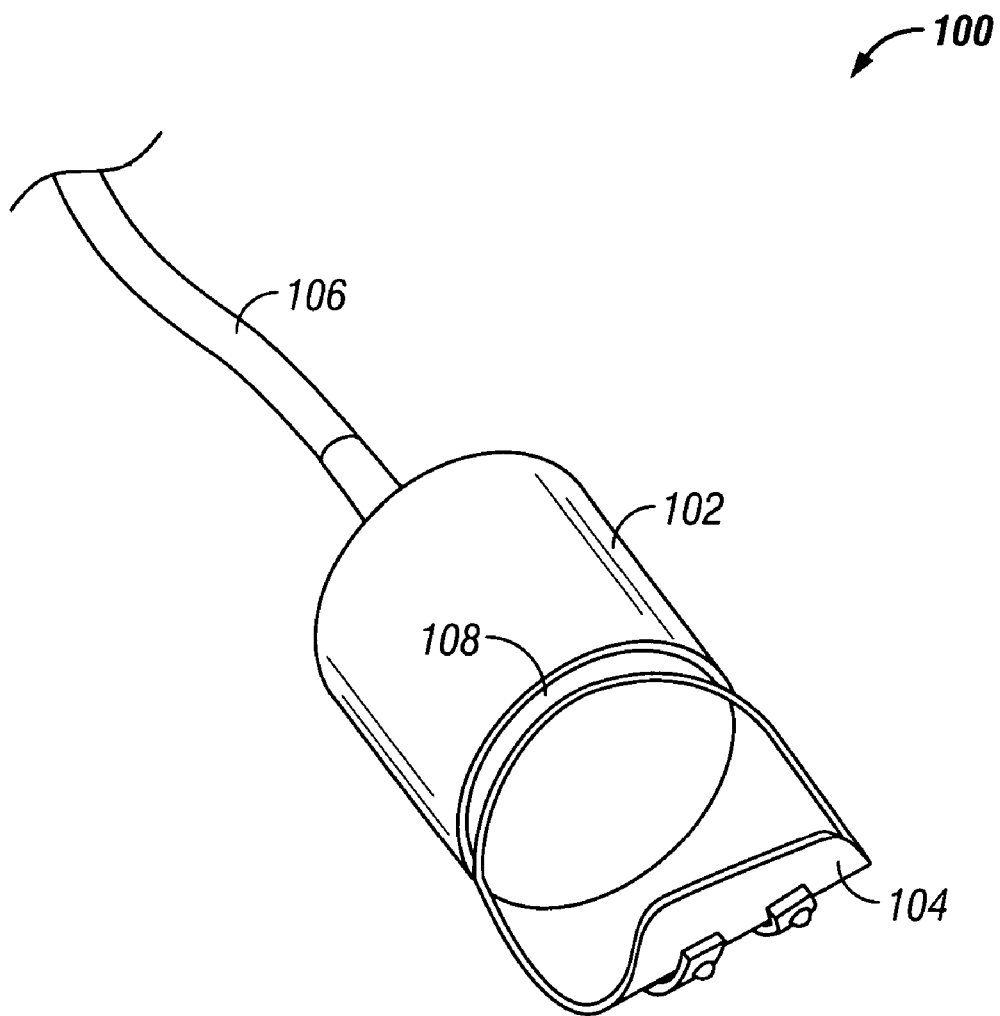
FIG. 8 is a pictorial representation of a guide tool for protecting and guiding the bladder tube from an access pipe into another pipe.

FIG. 5 also shows a guide tool or "shoe" 100, which is an apparatus inserted into the access pipe 18 that protects the bladder tube 56 at the juncture between the access pipe 18 and the lateral sewer pipe 12 and directs the bladder tube 56 in a specific direction, either upstream or downstream in the lateral pipe 12. The guide tool 100 (shown in FIG. 8) includes a circular cylindrical portion 102 with an arcuate portion 104 extending there from. The cylindrical portion 102 of the guide tool 100 is positioned adjacent the opening between the access pipe 18 and the lateral sewer pipe 12. The cylindrical portion 102 protects the bladder tube 56 against the edges of the sewer pipes about the juncture between the access pipe 18 and the lateral sewer pipe 12. A protective lining 108, preferably made of rubber, extends below the underside of the cylindrical portion 102 to act as a cushion between the bladder tube 56 and the exposed edge of the cylinder. Insertion of the bladder into the cylindrical portion 102 causes the protective liner to double back against the edge of the cylindrical portion. The arcuate portion 104 functions much like a shoehorn, directing the bladder tube 56 in the appropriate direction along the lateral sewer pipe 12. The arcuate portion 104 in combination with the cylindrical portion 102 of the guide tool 100 also prevent the bladder tube 56 from being unconstrained at the back side. If the bladder tube 56 is left unconstrained on the back side as it enters the lateral sewer pipe 12, the bladder could expand or tumor and burst. The guide tool 100 is attached to a flexible cable 106, such as a steel spring or a hose, allowing any remaining portion of the cable or hose to easily bend at the top of the access pipe 18 and lay on the ground. The guide tool 100 is positioned within the pipes before the inversion process starts and is removed after the bladder is retracted.

FIG. 6 shows the bladder/liner assembly 54 after the inversion process has been completed. It will be seen that the liner tube 64 has moved from the interior of the bladder tube 56 (as shown in FIG. 5) to the exterior of the bladder tube 56 as shown in FIG. 6. Furthermore, the liner tube 64 is located completely within the lateral pipe 12, but is removed from the access pipe 18 and is not included in the access pipe 18. Similarly, only the bladder tube is located at the non-blockage portion 65. Also, points D1 and D1" are aligned and points D2 and D2" are aligned to position liner tube 64 in registered alignment with the area 84 of the pipeline needing repair.

It is desirable to attach the liner tube 64 to the bladder tube 56 by a frangible attachment designated by the numeral 66 in FIGS. 4, 5 and 6. The frangible attachment between the lining 64 and the bladder 56 may be a solvent that chemically bonds the coating of the liner 64 to the bladder 56. Liner 64 is preferably made of a felt material, but its interior surface as shown in FIG. 4 (exterior surface as shown in FIG. 6) may include a film of polymer, such as polyethylene, polyurethane or polyvinylchloride. Furthermore, the bladder 56 is preferably made from a reinforced film of polymer. The frangible attachment 66 may be provided by solvent bonding the polymer of bladder tube 56 to the polymer of liner tube 64. The bonding is intended to be such that it attaches the liner tube 64 to the bladder tube 56. However, it is possible by pulling on pull line 62 to break the frangible attachment 66 between the bladder tube 56 and the liner tube 64. An example of a preferred solvent for use in this process is a product called Tetrahydrofuran, sold under product number 360589 by Sigma-Aldrich, 3050 Spruce Street, St. Louis, Mo. 63103. Using such adhesives or solvents allows the worker/operator to frangibly attach the liner to the bladder in the field, obviating the need for a more labor intensive and costly manufacturing process that must be performed off-site in a plant or factory. It also give the worker/operator more flexibility on the job site. This is a huge advance in the art.

Other means may be utilized for frangibly attaching the liner tube 64 to the bladder tube 56 at the junction 66. This can be accomplished by threads that dissolve or melt with time or with the application of solvents. There may be other means of frangible connections between the bladder and the lining such as stitches, buttons, snaps, hook and loop fasteners (Velcro®), two-sided tape, glue, welding techniques and such including but not limited to the use of hot air, sonic waves, RF waves, microwaves, impulses of other types, and any other method for frangibly attaching a lining to an inflation bladder. The term frangible attachment in the present invention relates to the ability of the attachment to connect the liner 64 to the bladder tube 56 during installation, but to permit the bladder tube 56 to be detached from the liner tube 64 upon the pulling of the pull rope 62.

A camera port 98 is provided in the well of external launcher 40 to permit cable 80 and lens 82 to be provided to the interior of bladder tube 56 so as to prevent the bladder tube 56 from entering too far beyond the area 84 to be repaired in the pipe 12 (See FIG. 6). This is important to the installer in order to know if the frangible attachment 66 has broken causing the liner 64 to fold flat, thereby preventing the inversion process. It is also important to know that the tube end furthest from the access pipe has fully inverted and is open with the bladder extending beyond the liner tube.

Figure 7:
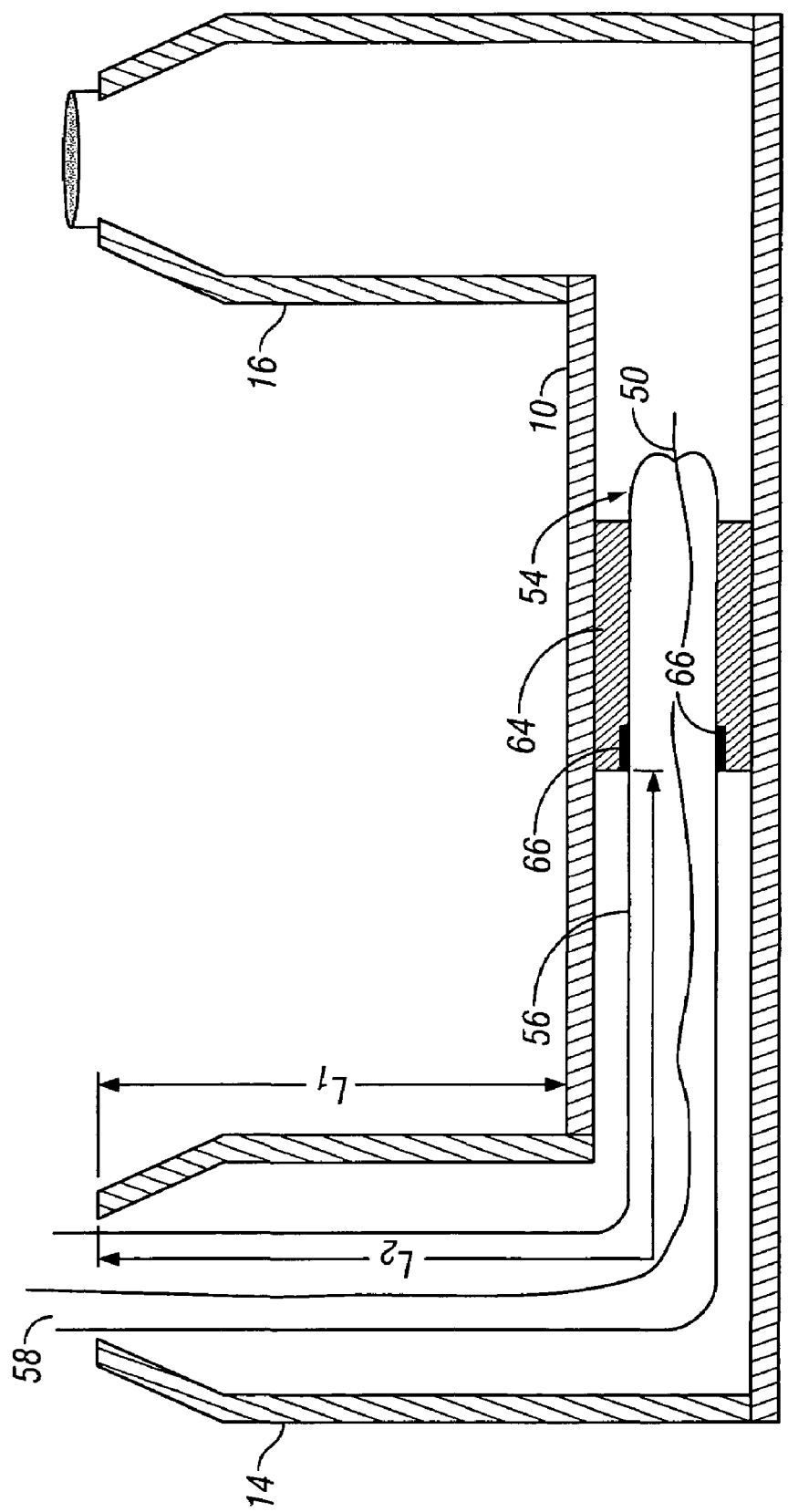
FIG. 7 is a pictorial representation of another embodiment of the present invention illustrating that the lining is allowed to be placed anywhere within any pipe or conduit that can be accessed from a single access pipe or manhole.

Referring to FIG. 7, a slightly modified form of the invention is shown. Instead of using the access pipe 18, a manhole 14 is utilized. The launcher 40 is utilized although not shown in FIG. 7 and is positioned externally of the manhole 14. It should be noted that the manhole is a distance of L1 between its upper end and its lower end. Similarly, the liner tube 66 is positioned from the end of the bladder tube 56 a distance L2. L2 is equal to or greater than L1, and therefore the liner is always positioned within the pipe 10 and not within the manhole 14. The frangible attachment 66 is also utilized to attach the liner tube 64 to the bladder tube 56, but to permit the bladder tube 56 to be removed after curing.

The methods shown in FIGS. 6 and 7 may be utilized to repair damaged lateral pipes 12 as shown or also may be utilized to repair damaged main line pipes 10. All that is necessary is to gain access to the main pipe 10 through manholes or other access pipes. For purposes of the present invention a manhole is the same as an access pipe and the method of positioning liner 64 is the same.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstance may suggest or render expedient without departing from the spirit or scope of the invention as further defined in the following claims. By way of example only, the lining methods described are not limited to sewer pipe applications, but can be easily applied to other applications, such as air ducts, gas pipes, water pipes, electrical conduits, shafts, tunnels and other similar conduits, by persons skilled in the pertinent art.

What is claimed is:

1. A method of making a cured-in-place pipe repair to a pipe having an area needing repair, with an access bore in communication with the pipe, the method comprising:

taking an elongated bladder tube having a first bladder end and a second bladder end;

placing an elongated liner tube within the bladder tube, the liner tube having first and second liner tube ends;

frangibly attaching the liner tube to the bladder tube using an adhesive or a solvent;

impregnating the liner tube with an uncured resin;

inverting the bladder tubes, with the liner tube remaining therein, into the access bore and into the pipe to a position wherein the liner tube is on the outside of the bladder tube and is positioned adjacent the area of the pipe needing repair and does not block the pipe;

permitting the uncured resin to cure and harden; and removing the bladder tube from the liner tube and the access bore to leave the liner tube cured in place within the pipe in a position which does not block the pipe.

2. The method of claim 1 wherein the liner tube includes a polymer coating.

3. The method of claim 1 wherein the step of inverting the bladder tube is accomplished by an inversion machine that is located at least partially outside the access bore.

4. The method of claim 3 further comprising inserting a camera cable having a lens thereon through a camera port in the inversion machine, and viewing the liner tube with the lens during the inversion step.

5. The method of claim 3 further comprising inserting a camera cable having a lens thereon through a camera port in the inversion machine, and viewing the liner tube with the lens after the inversion step.

6. The method of claim 1 wherein the liner tube is registered with the area of the pipe to be repaired.

7. A method of making a cured-in-place sewer pipe repair to a sewer pipe buried in the ground with an access bore in communication with the sewer pipe, the sewer pipe having a repair area needing repair with opposite repair area margins, the method comprising:

taking an elongated bladder tube;

positioning a liner tube inside the bladder tube;

frangibly attaching the liner tube to the bladder tube in the field;

impregnating the liner tube with a resin in an uncured state capable of curing and hardening;

inverting the bladder tube through the access bore with the liner tube remaining therein and into the sewer pipe to an inverted position whereby the liner tube is outside the bladder tube and is located within the sewer pipe;

positioning the liner tube within the sewer pipe during the inverting step with the liner tube adjacent the repair area of the sewer pipe and with the liner tube not blocking a flow of sewage through the sewer pipe;

permitting the uncured resin to cure and harden; and removing the bladder tube from the liner tube and the access bore to leave the liner tube cured in place within the sewer pipe.

8. The method according to claim 7 wherein the step of positioning the liner tube inside the bladder tube is accomplished by inserting a photo cable having a lens into the sewer pipe and marking the photo cable to correspond to the opposite margins of the repair area.

9. The method of claim 7 wherein the liner tube is frangibly attached to the bladder tube using an adhesive.

10. The method of claim 7 wherein the liner tube is frangibly attached to the bladder tube using a solvent.

11. The method of claim 10 wherein the solvent is tetrahydrofuran.

12. The method of claim 7 wherein the liner tube is frangibly attached to the bladder tube using adhesive tape.

13. The method of claim 7 wherein the liner tube is frangibly attached to the bladder tube using hook and loop fasteners.

14. The method of claim 7 wherein the liner tube is frangibly attached to the bladder tube with glue.

15. The method of claim 7 wherein the liner tube is frangibly attached to the bladder tube by welding.

16. A method of making a cured-in-place pipe repair to a pipe having an area needing repair with an access bore having a lower access bore end in communication with the pipe and having an upper access bore end in communication with the atmosphere, the method comprising:

taking an elongated positioning tube having a first end and a second end;

taking an elongated liner tube having first and second liner tube ends;

frangibly attaching the liner tube to the positioning tube near one of the first and second ends of the positioning tube using an adhesive or a solvent;

impregnating the liner tube with an uncured resin;

inverting the positioning tube through the access bore with the liner tube remaining and into the pipe to a position wherein the liner tube is outside the positioning tube and adjacent the area of the pipe needing repair and does not block the pipe;

permitting the uncured resin to cure and harden; and removing the positioning tube from the liner tube to leave the liner tube cured in place within the pipe in a position which does not block the pipe.

17. The method of claim 16 wherein at least one of the first and second ends of the positioning tube is closed.

18. The method of claim 17 wherein the positioning tube presses the liner tube against the area of pipe needing repair.

19. The method of claim 16 wherein an inflatable bladder presses the liner tube against the area of the pipe needing repair.

20. The method of claim 19 wherein the inflatable bladder is the positioning tube.

21. A method of making a cured-in-place sewer pipe repair to a sewer pipe buried in the ground permitting a flow of sewage therethrough, the sewer pipe being accessible from an access point and having a repair area needing repair that is remote from the access point, the method comprising:

measuring a distance between the access point and the repair area of the sewer pipe;

taking an elongated bladder tube having a first end and a second end;

positioning a liner tube within the bladder tube with the liner tube spaced apart from the first end of the bladder tube by approximately the distance between the access point and the repair area of the sewer pipe;

frangibly attaching the liner tube to the bladder tube;

impregnating the liner tube with a resin in an uncured state capable of curing and hardening;

positioning the first end of the bladder tube near the access point;

inverting the bladder tube from the access point and into the sewer pipe to an inverted position with the liner tube adjacent the repair area of the sewer pipe;

permitting the uncured resin to cure and harden; and removing the bladder tube from the liner tube to leave the liner tube cured in place within the sewer pipe and the liner tube not blocking the flow or sewage through the sewer pipe.

22. The method of claim 21 wherein the access point is at an end of an access pipe in communication with the atmosphere, the access pipe having a second end in communication with the sewer pipe.

23. The method of claim 21 wherein the liner tube is frangibly attached to the bladder tube in the field.

24. The method of claim 21 wherein the access point is at a cleanout pipe in communication with the atmosphere and the sewer pipe.

25. The method of claim 21 wherein the access point is at a sewer manhole in communication with the atmosphere and the sewer pipe.

26. The method of claim 21 wherein the sewer pipe is a lateral sewer pipe.

27. The method of claim 1 wherein the access bore having a lower end in communication with the pipe and an upper end in communication with the atmosphere.

28. The method of claim 24 wherein the access bore is formed from a cleanout pipe.

* * * * *

UNITED STATES PATENT AND TRADEMARK OFFICE
CERTIFICATE OF CORRECTION

PATENT NO.         : 7,343,937 B2                                            Page 1 of 1
APPLICATION NO. : 11/359026
DATED               : March 18, 2008
INVENTOR(S)      : Larry W. Kiest, Jr.

It is certified that error appears in the above-identified patent and that said Letters Patent is hereby corrected as shown below:

Col. 7, Claim 1, lines 33-34:
DELETE after bladder "tubes, with the liner tube remaining therein,"
ADD after bladder --tube--

Col. 7, Claim 1, line 34:
ADD after bore --with the liner tube remaining therein--

Col. 8, Claim 16, line 47:
ADD after remaining --therein--

Signed and Sealed this

Sixteenth Day of December, 2008

JON W. DUDAS
*Director of the United States Patent and Trademark Office*